(12) United States Patent
Su

(10) Patent No.: US 7,256,698 B2
(45) Date of Patent: Aug. 14, 2007

(54) SPINDLE WITH AN RFID FUNCTION

(75) Inventor: Liang Su, Miaoli Hsien (TW)

(73) Assignee: Prorit Corporation, Miaoli Hsien (TW)

( * ) Notice: Subject to any disclaimer, the term of this patent is extended or adjusted under 35 U.S.C. 154(b) by 375 days.

(21) Appl. No.: 11/062,834

(22) Filed: Feb. 23, 2005

(65) Prior Publication Data

US 2006/0224471 A1    Oct. 5, 2006

(51) Int. Cl.
*G06F 7/00*    (2006.01)
*G08B 13/14*    (2006.01)

(52) U.S. Cl. .................................. 340/572.8; 700/222

(58) Field of Classification Search .. 340/568.8–572.9; 705/28, 29; 700/95, 109, 110, 116, 177, 700/213, 214, 215, 222, 225, 231, 236, 244
See application file for complete search history.

(56) References Cited

U.S. PATENT DOCUMENTS

| | | | |
|---|---|---|---|
| 6,201,474 B1 * | 3/2001 | Brady et al. | 340/572.8 |
| 2002/0060629 A1 * | 5/2002 | Pfeiffer et al. | 340/572.8 |
| 2006/0016885 A1 * | 1/2006 | Roberts et al. | 235/383 |
| 2006/0023575 A1 * | 2/2006 | Hayashi et al. | 369/30.37 |

* cited by examiner

*Primary Examiner*—Benjamin C. Lee
*Assistant Examiner*—Jennifer Mehmood
(74) *Attorney, Agent, or Firm*—Rosenberg, Klein & Lee

(57) ABSTRACT

A spindle with an RFID function includes a disc support and an RFID tag. The disc support has a bottom seat, and a positioning axle connecting to the bottom seat. The disc support is used to support discs in a disc production process. The RFID tag is installed inside or attached onto the disc support for managing the disc production process. Whereby, the spindle with RFID tag can not only be used to accommodate the at least one disc, but also to manage or quickly integrate the disc production process and the disc material flow, prevent the disc production process from error-occurring, and to provide a burglarproof function.

12 Claims, 4 Drawing Sheets

SPINDLE WITH AN RFID FUNCTION

BACKGROUND OF THE INVENTION

1. Field of the Invention

The present invention relates to a spindle with an RFID function, and particularly relates to a spindle including a disc support and an RFID tag. The RFID tag is attached on or installed inside the disc support.

2. Description of Related Art

A multi-disc box manufactured by a regular disc factory is used to carry discs, in order to have at least one disc transported to its destination inside the multi-disc box. However, the regular multi-disc box has only a carrying function; it lacks the function of information management.

In general, the management of the quantity of multi-disc boxes held by a store or warehouse for example, is conducted by manual counting, or by manually scanning the bar code on the DVD boxes with a scanning device. However, these methods not only allow mistakes to be made easily, but also require a lot of time to ascertain the quantity of discs held. Moreover, it is impossible to manage the disc production process and the disc material flow with a regular disc. Disc information can not be incorporated in a regular disc, so production costs will be raised and manpower will be wasted.

SUMMARY OF THE INVENTION

The present invention provides a spindle with an RFID function. The spindle includes a disc support and an RFID tag. The RFID tag is attached on or installed inside the disc support. The spindle with RFID tag can not only be used to accommodate a disc, but also to manage or quickly integrate the disc production process and the disc material flow, prevent the disc production process from error-occurring, and provide a burglarproof function.

One aspect of the invention is a spindle with an RFID function. The spindle includes a disc support and an RFID tag. The disc support has a bottom seat, and a positioning axle connecting to the bottom seat. The disc support is used to support discs in a disc production process. The RFID tag is installed inside the disc support for managing the disc production process.

Another aspect of the invention is a spindle with an RFID function. The spindle includes a disc support and an RFID tag. The disc support has a bottom seat, and a positioning axle connecting to the bottom seat. The disc support is used to support discs in a disc production process. The RFID tag is attached on the disc support for managing the disc production process.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objectives and advantages of the present invention will be more readily understood from the following detailed description when read in conjunction with the appended drawing, in which.

DETAILED DESCRIPTION OF PREFERRED EMBODIMENTS

Figure 1:
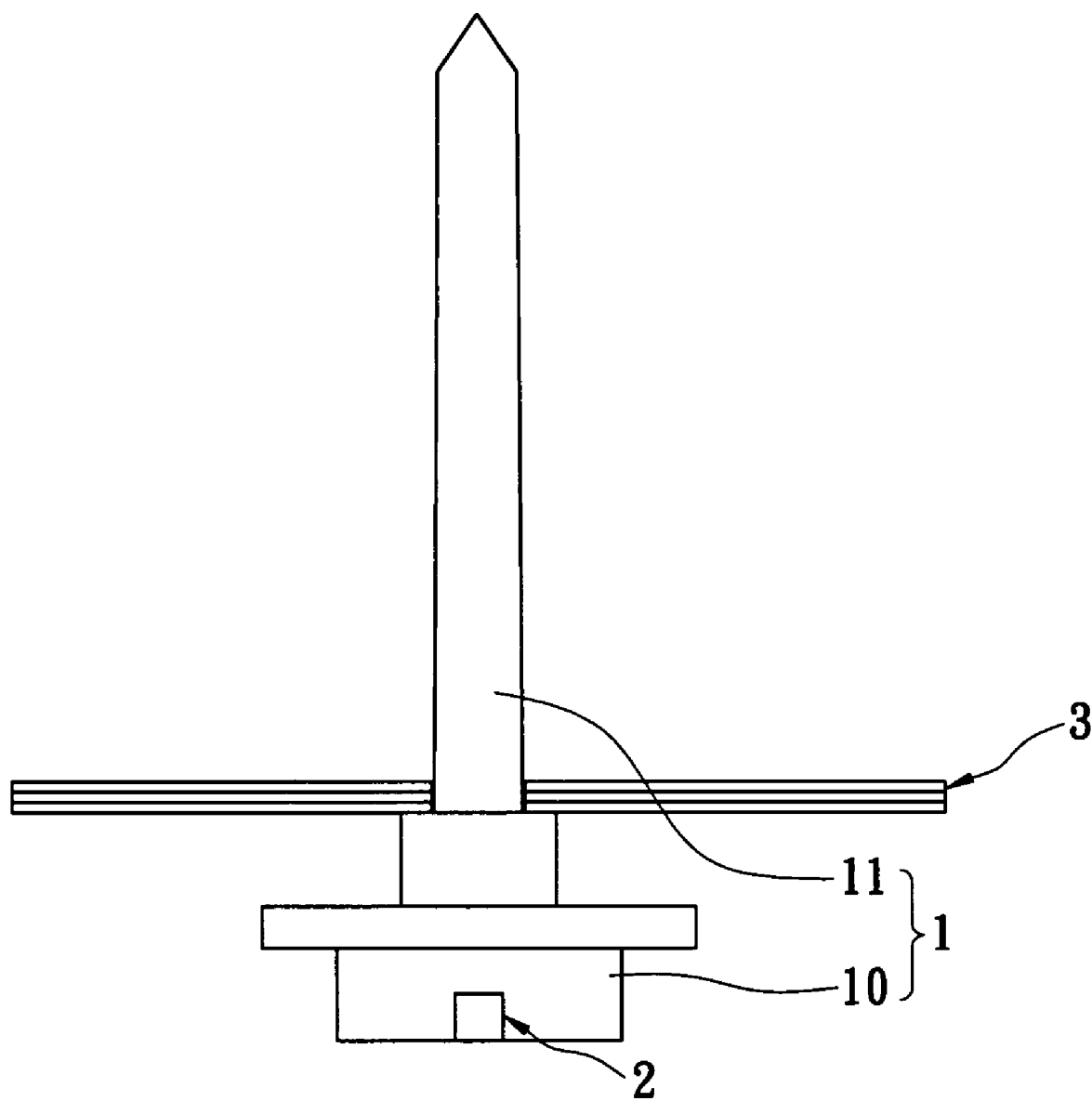
FIG. 1 is an exploded, perspective view of a spindle with an RFID function according to a first embodiment (an RFID is attached on a bottom seat) of the present invention.
Figure 2:
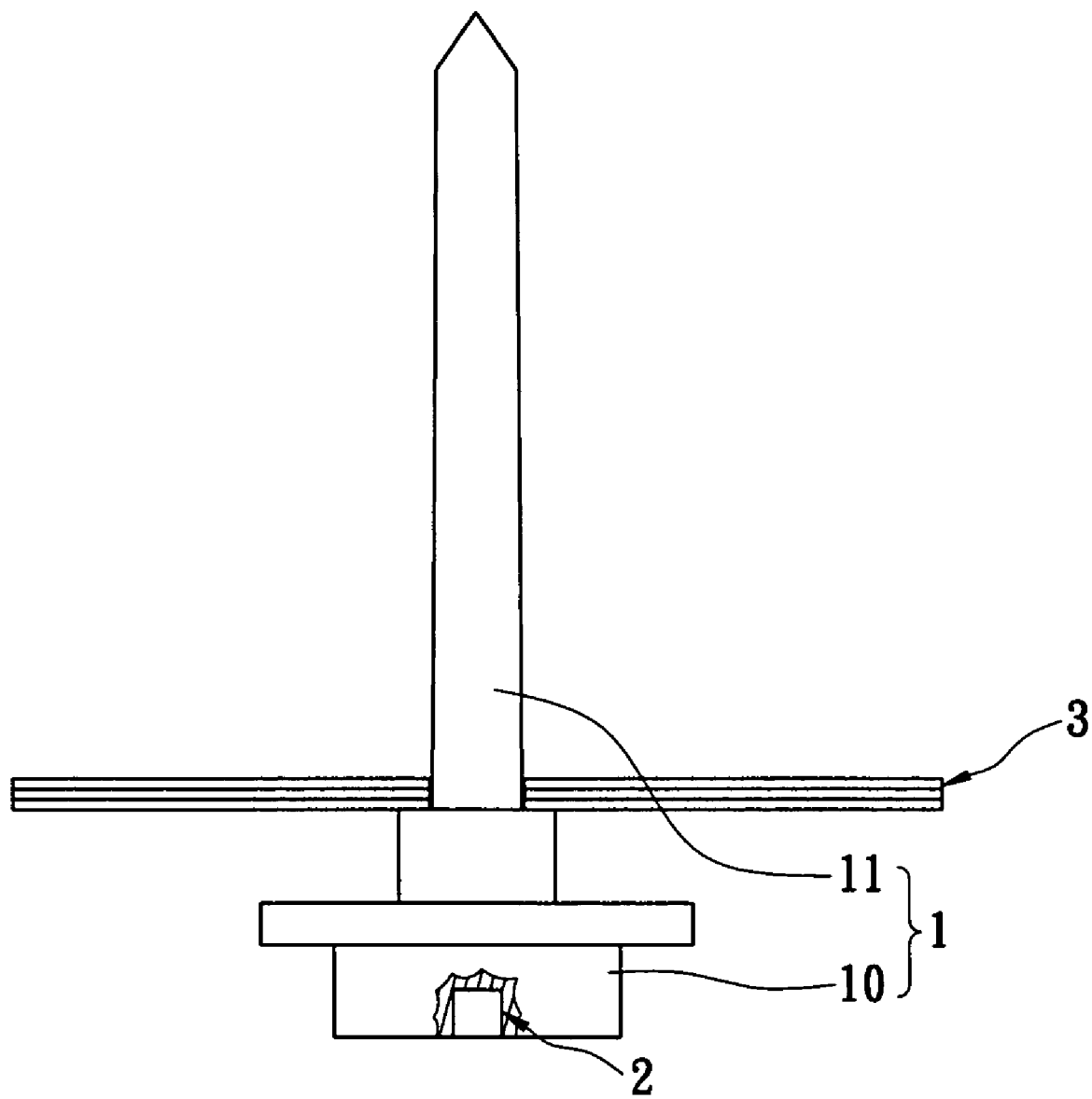
FIG. 2 is an exploded, perspective view of a spindle with an RFID function according to a second embodiment (an RFID is installed inside a bottom seat) of the present invention.

FIGS. 1 and 2 show an exploded, perspective view of a spindle with an RFID (Radio Frequency Identification) function according to the first embodiment and the second embodiment of the present invention, respectively. The spindle includes a disc support 1 and an RFID tag 2.

The disc support 1 has a bottom seat 10, and a positioning axle 11 connecting to the bottom seat 10. The disc support 1 is used to support a disc 3 in a disc production process. The RFID tag 2 is installed inside the disc support 1 for managing the disc production process.

Referring to FIG. 1, the RFID tag 2 is attached on the bottom seat 10 of the disc support 1 by a sticking method or a printing method. Referring to FIG. 2, the RFID tag 2 is installed inside the bottom seat 10 of the disc support 1 by an embedding method or an injection molding method. However, the above methods should not be used to restrict the present invention.

Figure 3:
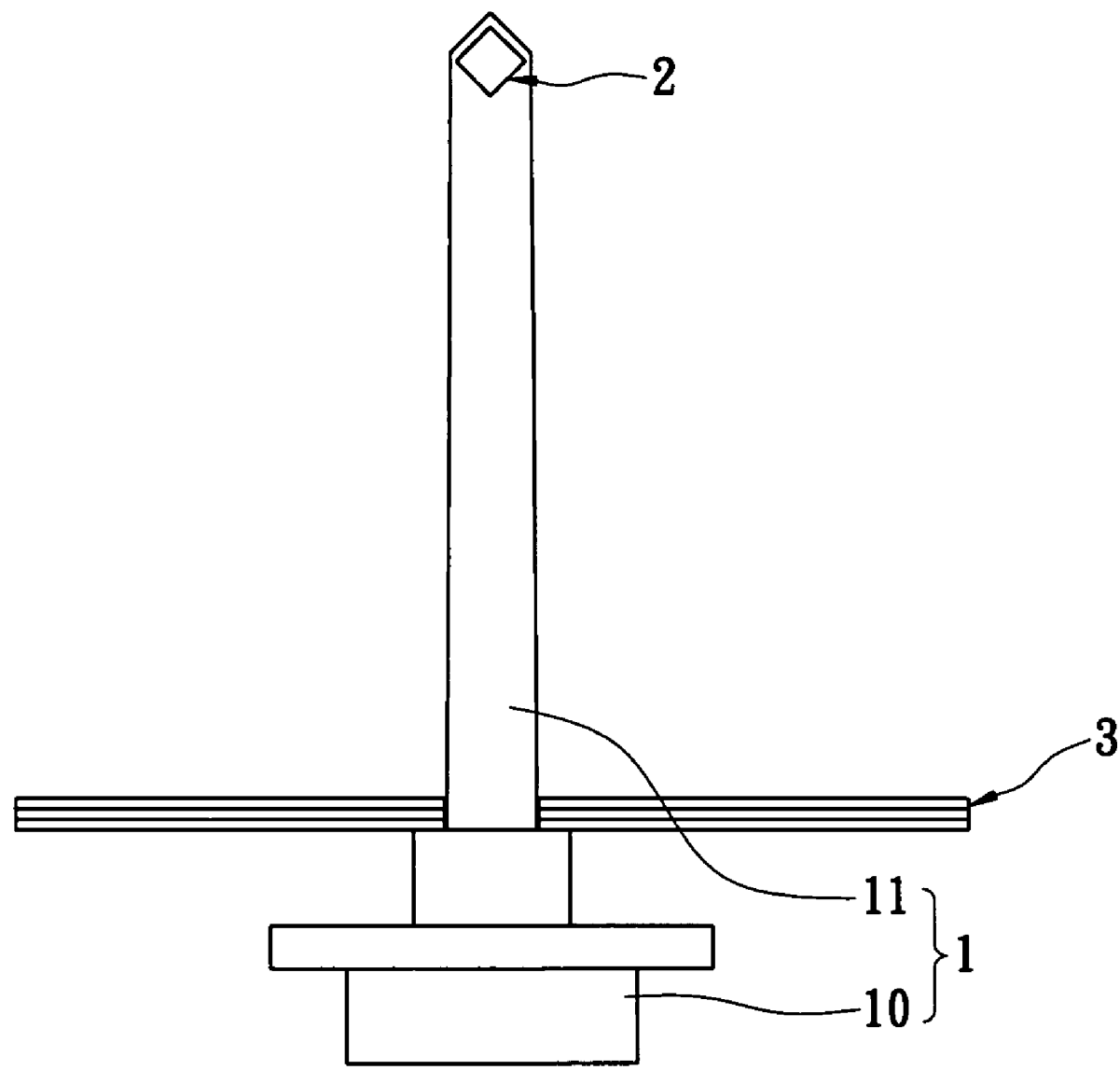
FIG. 3 is an exploded, perspective view of a spindle with an RFID function according to a third embodiment (an RFID is attached on a positioning axle) of the present invention.
Figure 4:
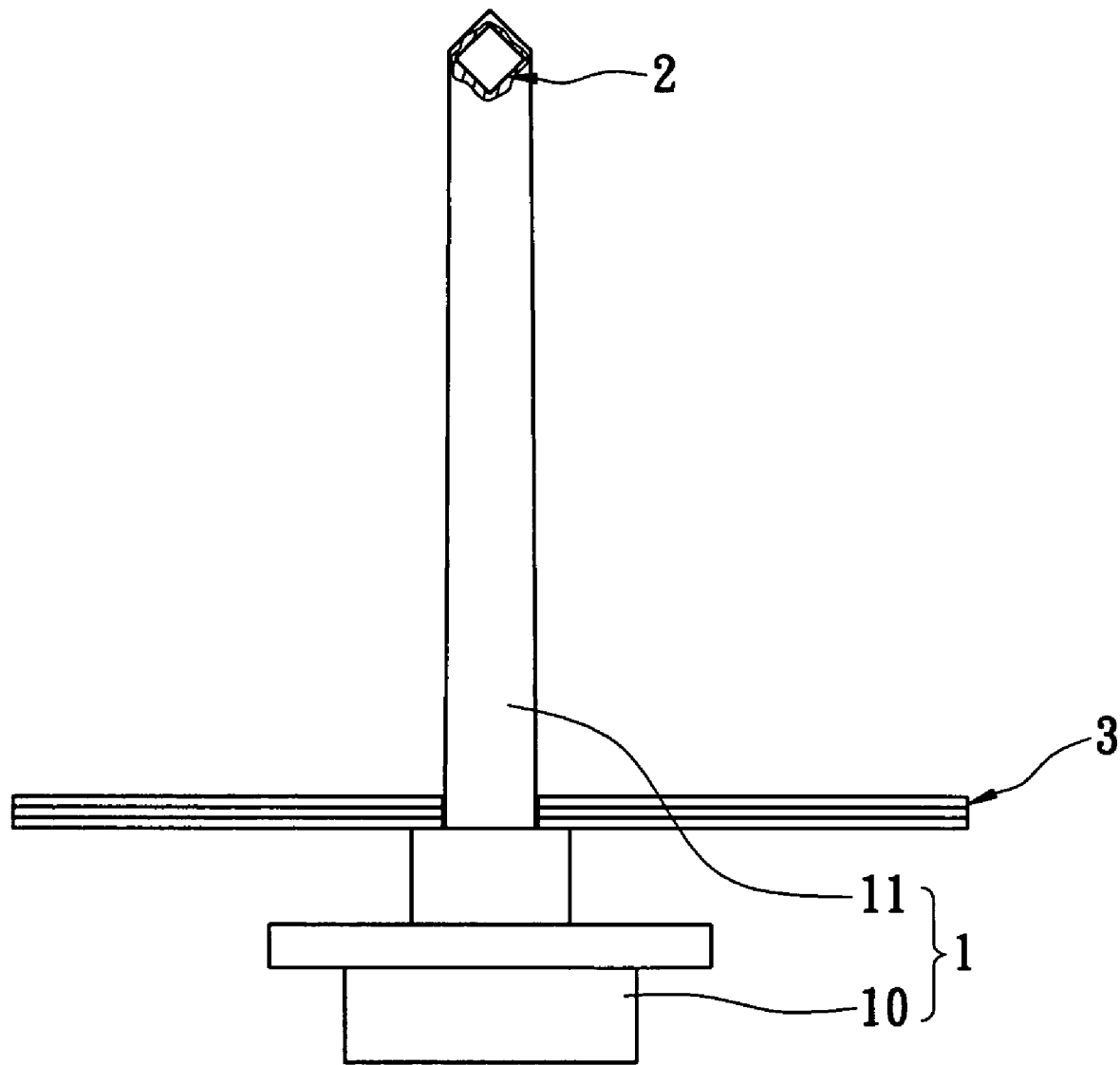
FIG. 4 is an exploded, perspective view of a spindle with an RFID function according to a fourth embodiment (an RFID is installed inside a positioning axle) of the present invention.

FIGS. 3 and 4 show an exploded, perspective view of a spindle with an RFID function according to the third embodiment and the fourth embodiment of the present invention, respectively. Referring to FIG. 3, the RFID tag 2 is attached on the positioning axle 11 of the disc support 1 by a sticking method or a printing method. Referring to FIG. 4, the RFID tag 2 is installed inside the positioning axle 11 of the disc support 1 by an embedding method or an injection molding method. However, the above methods should not be used to restrict the present invention.

Moreover, the RFID tag has data of the disc production process installed therein. The data of the disc production process is returned back to user in the process of reading the RFID tag for increasing efficiency and preventing the making if any errors. The disc production process includes a disc forming process, a dye-coating process, a metal sputtering process, a disc number detecting process, or a discs packaging process The disc production process is managed by a method of reading the RFID tag by a reader (not shown). In order to use the reader in different ways (point scan or non-point scan) to obtain the data of the disc production process, the reader can be a PC, a portable computer or a PDA (Personal Digital Assistant) according to the user's preference.

In other words, the spindle with an RFID tag can not only be used to accommodate the at least one disc, but also to manage or quickly integrate the disc production process and the disc material flow, prevent the disc production process from error-occurring, and to provide a burglarproof function.

Although the present invention has been described with reference to the preferred embodiment thereof, it will be understood that the invention is not limited to the details thereof Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A spindle with an RFID function, comprising:
   a disc support having a bottom seat, and a positioning axle connecting to the bottom seat, and the disc support for supporting discs in a disc production process; and
   an RFID tag, containing data of the disc production process, installed inside the disc support thereby automatically and quantifyingly eliminating errors accumulated during the production process.

2. The spindle as claimed in claim 1, wherein the RFID tag is installed inside the bottom seat of the disc support by an embedding method or an injection molding method.

3. The spindle as claimed in claim 1, wherein the RFID tag is installed inside the positioning axle of the disc support by an embedding method or an injection molding method.

4. The spindle as claimed in claim 1, wherein the disc production process comprises a disc forming process, a dye-coating process, a metal sputtering process, a disc number detecting process, or a disc packaging process.

5. The spindle as claimed in claim 1, wherein the disc production process is managed by a method of reading the RFID tag by a reader.

6. The spindle as claimed in claim 5, wherein the reader is a PC, a portable computer or a PDA.

7. A spindle with an RFID function, comprising:
   a disc support having a bottom seat, and a positioning axle connecting to the bottom seat, and the disc support for supporting discs in a disc production process; and
   an RFID tag, containing data of the disc production process attached on the disc support thereby automatically and quantifyingly eliminating errors accumulated during the production process.

8. The spindle as claimed in claim 7, wherein the RFID tag is attached onto the bottom seat of the disc support by a sticking method or a printing method.

9. The spindle as claimed in claim 7, wherein the RFID tag is attached onto the positioning axle of the disc support by a sticking method or a printing method.

10. The spindle as claimed in claim 7, wherein the disc production process comprises a disc forming process, a dye-coating process, a metal sputtering process, a disc number detecting process, or a discs packaging process.

11. The spindle as claimed in claim 7, wherein the disc production process is managed by a method of reading the RFID tag by a reader.

12. The spindle as claimed in claim 11, wherein the reader is a PC, a portable computer or a PDA.

* * * * *